United States Patent [19]

Asano et al.

[11] Patent Number: 5,636,343

[45] Date of Patent: Jun. 3, 1997

[54] MICROCOMPUTER WITH BUILT-IN SERIAL INPUT-OUTPUT CIRCUIT AND COLLISION DETECTION CIRCUIT RESPONSIVE TO COMMON INPUT-OUTPUT LINE BEING OCCUPIED

[75] Inventors: Masahiro Asano; Kimikatsu Matsubara, both of Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 458,000

[22] Filed: Jun. 2, 1995

[30] Foreign Application Priority Data

Jan. 31, 1995 [JP] Japan .................................. 7-014022

[51] Int. Cl.$^6$ .................................. G06F 13/376
[52] U.S. Cl. .................................. 395/200.06; 395/200.12; 395/200.13
[58] Field of Search .................................. 395/200, 821; 340/825.5; 364/242.95

[56] References Cited

U.S. PATENT DOCUMENTS

| | | | |
|---|---|---|---|
| 4,063,220 | 12/1977 | Metcalfe et al. | 340/825.5 |
| 4,259,663 | 3/1981 | Gable | 340/825.5 |
| 4,271,523 | 6/1981 | Gable | 371/57.1 |
| 4,281,380 | 7/1981 | DeMesa, III et al. | 395/200 |
| 4,667,192 | 5/1987 | Schmid et al. | 340/825.5 |
| 4,715,031 | 12/1987 | Crawford et al. | 370/462 |
| 4,750,168 | 6/1988 | Trevitt | 370/85.7 |
| 5,012,467 | 4/1991 | Crane | 370/85.3 |

FOREIGN PATENT DOCUMENTS

| | | |
|---|---|---|
| 2527896A1 | 10/1976 | Germany . |
| 3331233C2 | 8/1985 | Germany . |
| 289188A7 | 4/1991 | Germany . |
| 5-233538 | 9/1993 | Japan . |

OTHER PUBLICATIONS

Mitsubishi Electric Corp., Mitsubishi Microcomputer Manual M37477/M37478, Mar. 1994.
International Organization of Standardization/Draft International Standard, 1991.
Michael Roth, MIKROPROZESSOREN, Wissenschaftliche Zeitschrift der Technischen Hochschule Ilmenau, 1980, pp. 163, 164.

Primary Examiner—Thomas C. Lee
Assistant Examiner—Steven Wan
Attorney, Agent, or Firm—Lowe, Price, LeBlanc & Becker

[57] ABSTRACT

Even in the case where a microcomputer according to the present invention is directly connected to a bus in a LAN, it is possible to upgrade the data transfer speed of the LAN. When a built-in exclusive-OR circuit in the SIO of the microcomputer detects the discordance between a signal at an R×D terminal and a signal at a T×D terminal, a D flip-flop circuit generates and sends out an interrupt signal to the CPU. The CPU is made to recognize the collision of signals by the generation of the interrupt signal.

6 Claims, 8 Drawing Sheets

MICROCOMPUTER WITH BUILT-IN SERIAL INPUT-OUTPUT CIRCUIT AND COLLISION DETECTION CIRCUIT RESPONSIVE TO COMMON INPUT-OUTPUT LINE BEING OCCUPIED

BACKGROUND OF THE INVENTION

1. Field of the Invention

The present invention relates to a microcomputer which comprises a built-in serial input-output circuit which outputs data in converting parallel data into serial data and converts input serial data into parallel data.

2. Description of the Prior Art

FIG. 5 is a block diagram showing the internal configuration of a serial input-output circuit (SIO) which realizes synchronous data transfer which is shown in a user's manual for Mitsubishi microcomputer M37477/M37478 group (issued by Mitsubishi Electric Corporation in March, 1994). In the figure, there are shown a clock signal control portion 51 which forms a data transfer clock signal using a clock signal given by an Xin or SCLK, a receiving shift register 52 which shifts a serial receiving signal input from an RxD terminal, a receiving buffer register 53 which inputs the data in the receiving shift register 52 when the receiving shift register 52 is full of data, a transmitting buffer register 54 in which transmitting data are set, a transmitting shift register 55 which inputs the transmitting data in the transmitting buffer register 54 and serializes the transmitting data and outputs the data to a TxD terminal, a switch 56 which decides the generating point of time of an interrupt signal to be given to the CPU whether it is the point of time when the data in the transmitting buffer register 54 are transferred to the transmitting shift register 55 or it is the point of time when the data in the transmitting shift register 55 are completely output, and a data bus 110. Either a clock signal generated in the microcomputer or a clock signal input from an external circuit can be used as a clock signal from the Xin.

FIG. 6 is a block diagram showing the internal configuration of a one-chip microcomputer having a built-in SIO. In the figure, reference numeral 101 represents a CPU which executes predetermined operation or control according to a program stored in a ROM 102; 103, a RAM for storing data; 104, a timer for measuring necessary period of time, etc.; 105, an input-output port for performing interchange of data with an external circuit; 106, a D-A converter which outputs data to the external circuit in converting digital values to analog values; 107, an A-D converter which outputs data to the external circuit in converting analog values to digital values; 108, the SIO shown in FIG. 5; and 109, a clock signal generator for generating a clock signal. In the microcomputer, the input-output line for the D-A converter 106, the A-D converter 107 and the SIO 108 is used in common with the input-output line for the IO port 105.

Next, the operation will be explained. In the case of transmission, the CPU 101 performs a predetermined setting for an SIO control register (not shown) and after that, writes the data to be transmitted in the transmitting buffer register 54. The contents of the transmitting buffer register 54 are transferred to the transmitting shift register 55. In the case where the switch 56 is so set that an interrupt signal TI is generated when the data in the transmitting buffer register 54 is transferred to the transmitting shift register 55, an interrupt signal is generated. When there are data to be transmitted in the next step, the CPU 101 writes the data to the transmitting buffer register 54. The written data are transferred to the transmitting shift register 55 when all data in the transmitting shift register 55 are output.

The transmitting shift register 55 shifts data according to the clock signal from the clock control portion 51. The bits squeezed out of the transmitting shift register 55 are output from the TxD terminal. In the case where the switch 56 is so set that an interrupt signal TI is generated when all data in the transmitting shift register 55 are output, the interrupt signal TI is generated when all bits in the transmitting shift register 55 are output from the TxD terminal.

In a receiving period, the receiving shift register 52 takes in the data input through the RxD terminal in accordance with the clock signal from the clock signal control portion 51 and shifts the content bit by bit. When the data corresponding to the bit length of the receiving shift register 52 is input, the data in the receiving shift register 52 are transferred to the receiving buffer register 53. At the same time, an interrupt signal RI is generated. An RBF (receiving buffer full) flag in the SIO control register is made ON. The CPU 101, in correspondence to the interrupt signal, or detecting the ON of the RBF flag, takes in data from the receiving buffer register 53.

FIG. 7 is a block diagram showing the internal configuration of the SIO for realizing asynchronous data transfer which is described in the above user's manual. In the figure, there are shown a ST detector 57 for detecting a start bit, and an ST/SP/PA generator 58 for generating a start bit, a stop bit and a parity bit.

Next, the operation will be explained. The operation in a transmitting period is about the same as that shown in FIG. 5. However in this case, preceding the output of a first bit in the transmitting shift register 55, the ST/SP/PA generator 58 outputs a start bit to the TxD terminal. After the output of an end bit in the transmitting shift register 55, a stop bit is output to the TxD terminal by the ST/SP/PA generator 58. In the case where a parity permission flag in the SIO control register is ON, the ST/SP/PA generator 58 forms a parity bit and outputs it to the TxD terminal.

The operation in a receiving period is about the same as that shown in FIG. 5. However in this case, when a start bit is detected by the ST detector 57, the following serial data are supplied to the receiving shift register 52. When a stop bit is detected by the ST detector 57, the data in the receiving shift register 52 are transferred to the receiving buffer register 53.

In the M37477/M37478, an SIO realizes either synchronous data transfer or asynchronous data transfer corresponding to the setting of a predetermined bit in the SIO control register.

It is considered to constitute a LAN with microcomputers utilizing the SIO function of the microcomputers. There is an ISO/DIS 11519-3 (J1850) standard for example, as a LAN standard which can be applied to such a LAN. The J1850 standard is a LAN standard of a bus type of a so called multimaster system. In the J1850 standard, there is a period of time in which respective terminal stations output priority codes following the start bit period of time. When a certain terminal station, a microcomputer in this case, outputs a start bit to a transmission line, other microcomputers which desire to output data output start bits to the transmission line simultaneously. Following the above, the microcomputers which desire to output data output priority codes to the transmission line. The data such as start bits or priority codes are PWM pulses as shown in FIG. 8. The priority code sent out by a microcomputer having the highest priority remains in the transmission line.

Therefore, the data and the priority code are compared with each other and when they coincide, a transmitting right is allotted. The process of obtaining the transmission right as described in the above is called arbitration. The comparison between the data and the priority code on the transmission line is called an arbitration judgment. The example shown in FIG. 8 shows a state wherein the priority code sent out by a microcomputer on a B side coincides with the data on the transmission line and the microcomputer on the B side continues transmission. Since a fourth bit in the priority code sent out by a microcomputer on an A side does not coincide with that in the data on the transmission line, the transmission of data is stopped, and since a second bit in the priority code sent out by a microcomputer on a C side does not coincide with that in the data on the transmission line, the transmission of data is stopped.

In order to communicate in a LAN which requires the above-mentioned collision detection, it is good to add LAN control circuits 120a, 120b and 120c having a collision detection function respectively to microcomputers 100a, 100b and 100c, respectively, as shown in FIG. 9. Drivers 130a, 130b and 130c are provided between a transmission line 200 and the LAN control circuits 120a, 120b and 120c. With the above-mentioned configuration, a LAN communication can be realized; however, since the LAN control circuits have to be added, the cost of the system is increased.

In contrast to it, as shown in FIG. 10, a system can be considered in which the LAN control circuits 120a, 120b and 120c are eliminated, the input-output of data to the transmission line 200 is controlled by the SIO in the microcomputers 100a, 100b and 100c, and collision detection is performed with software. In such a system, the coincidence or discordance between the groups of data has to be judged by the bit in introducing the data at the TxD terminal and the data at the RxD terminal by some method or other into the CPU 101 by the bit. Taking example by the arbitration of J1850 shown in FIG. 8, the software of a microcomputer 100c on the C side has to detect discordance between groups of data before the completion of a period of a second bit of a priority code. Otherwise the microcomputer 100c on the C side sends out a priority code in a third bit to the transmission line 200. In the result, the data sent out by the microcomputer 100c on the C side are left on the transmission line 200 (refer to FIG. 8D), and the microcomputer on the A side and the microcomputer on the B side judge that their own priority codes do not coincide with the data on the transmission line 200 and both stop their transmission of data.

Since a microcomputer having a built-in serial input-output circuit is constituted as described in the above, when the transmission speed of the transmission line 200 is raised, the waking up period of the software for performing the detection of collision has to be shortened corresponding to it. However, there is a limit in the processing speed of software, therefore, there remains a problem that the transfer speed of data in a LAN is difficult to be upgraded. A prior art for collision detection, though it is not a built-in technology in a microcomputer, is shown in Japanese Patent Laid-Open No. Hei 5-233538.

SUMMARY OF THE INVENTION

The present invention was invented for solving the above-mentioned problem, and an object of the invention is to provide with a microcomputer having a built-in serial input-output circuit in which it is made possible to improve the data transfer speed in a LAN.

A microcomputer according to the present invention comprises a built-in serial input-output circuit being provided with a clock signal supply means which supplies a data transfer clock signal to the serial input-output means and a collision detecting means which compares a signal supplied to an output terminal and a signal from an input terminal.

The collision detecting means detects the discordance between the signal supplied to the output terminal and the signal from the input terminal and dispenses with a process in which the signal at the output terminal and the signal at the input terminal are compared by software to decrease the load on the software concerning the data transfer.

DETAILED DESCRIPTION OF THE PREFERRED EMBODIMENTS

Embodiment 1

Figure 1:
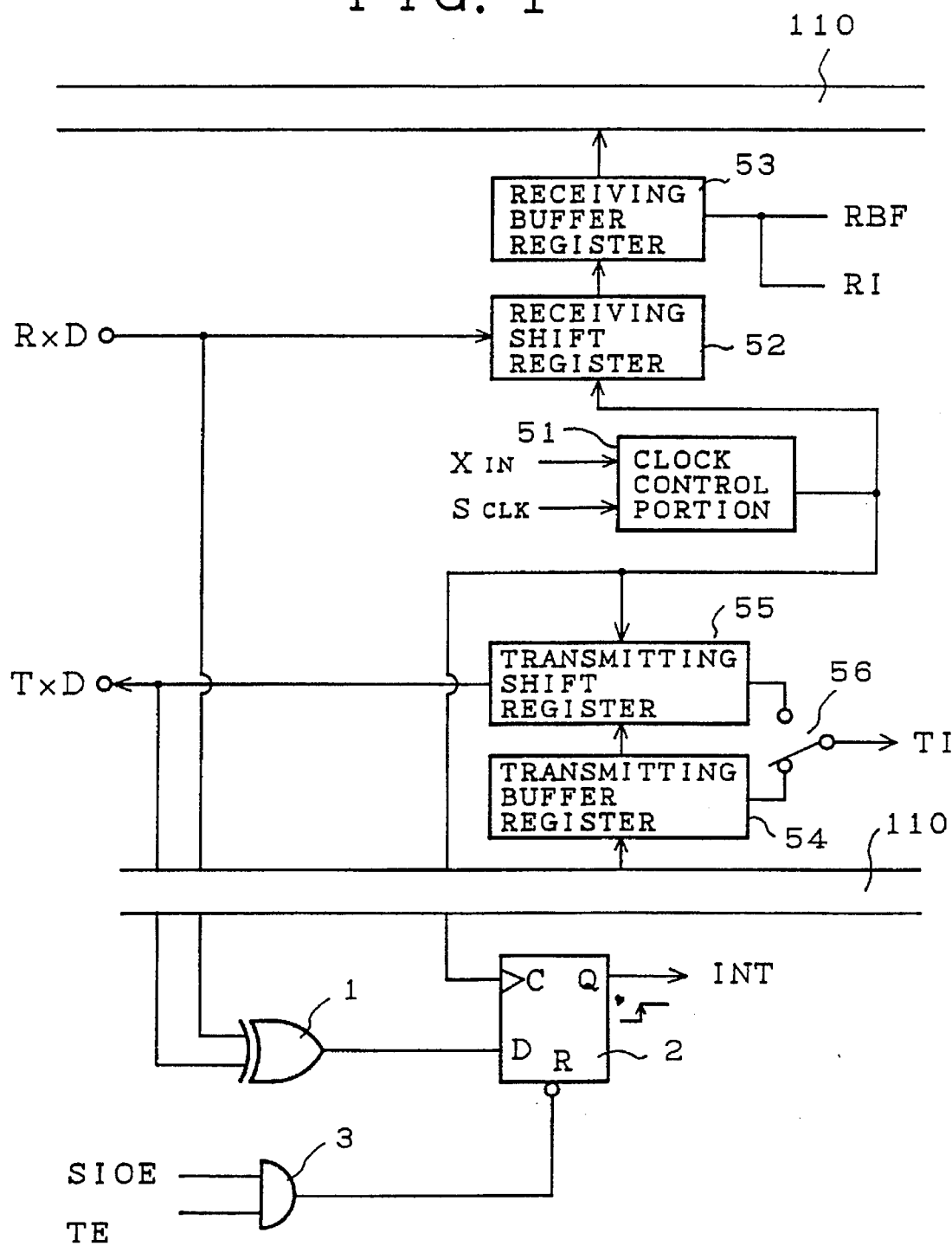
FIG. 1 is a block diagram showing a configuration of a built-in SIO in a microcomputer in a first embodiment according to the present invention.
Figure 5:
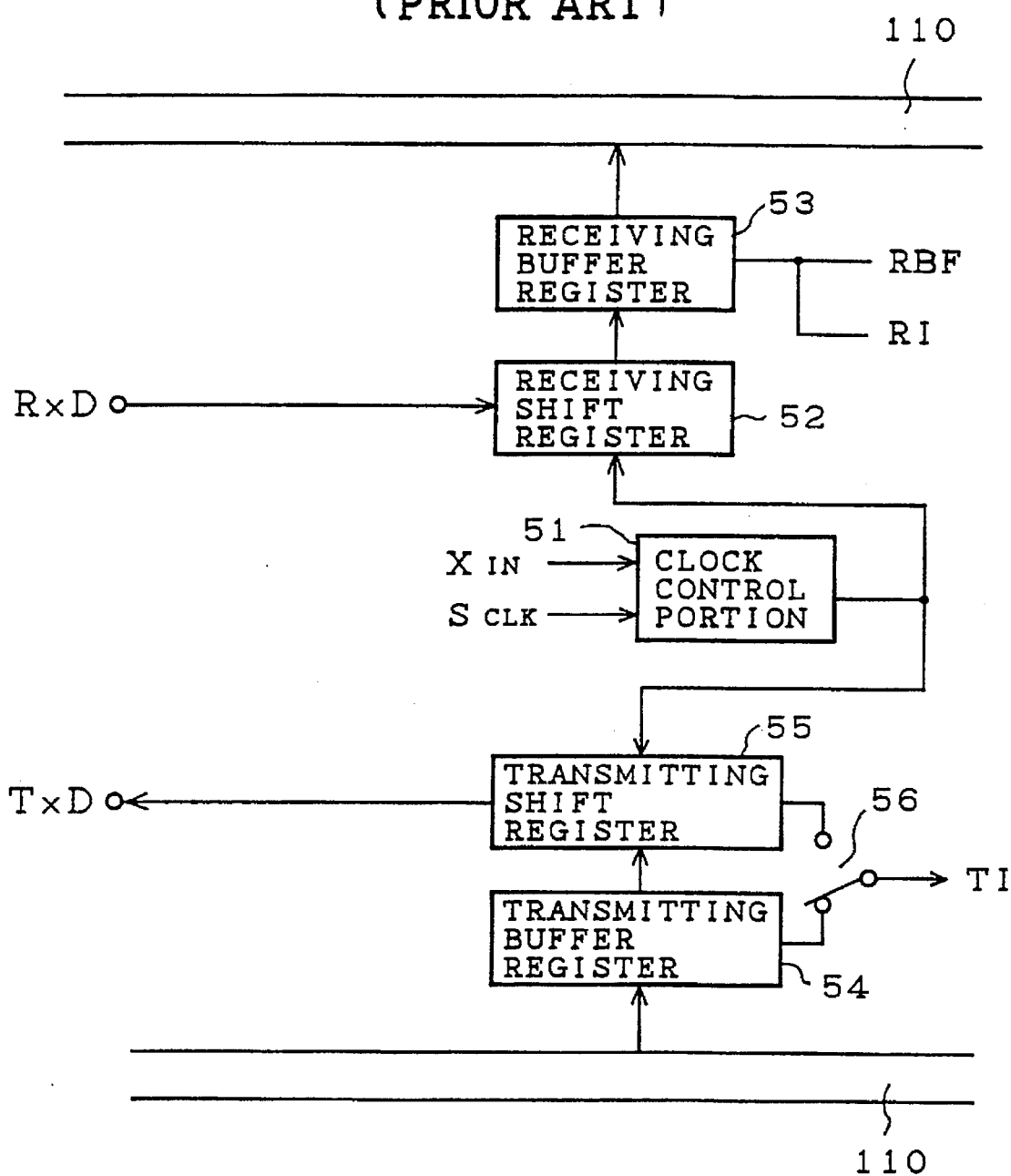
FIG. 5 is a block diagram showing a configuration of a built-in SIO in a conventional microcomputer.

FIG. 1 is a block diagram showing a configuration of a built-in SIO in a microcomputer in a first embodiment according to the present invention. In the figure, reference numeral 1 represents an exclusive-OR circuit to compare a signal at a TxD terminal and a signal at an RxD terminal; 2, a D flip-flop circuit to latch the output of the exclusive-OR circuit 1 with a clock signal; and 3, an AND circuit which inputs SIOE (SIO enable) flag and TE (transmission enable) flag and the output of the AND circuit 3 is connected to a reset terminal of the D flip-flop circuit 2. The other ones are the same as those shown in FIG. 5.

Figure 6:
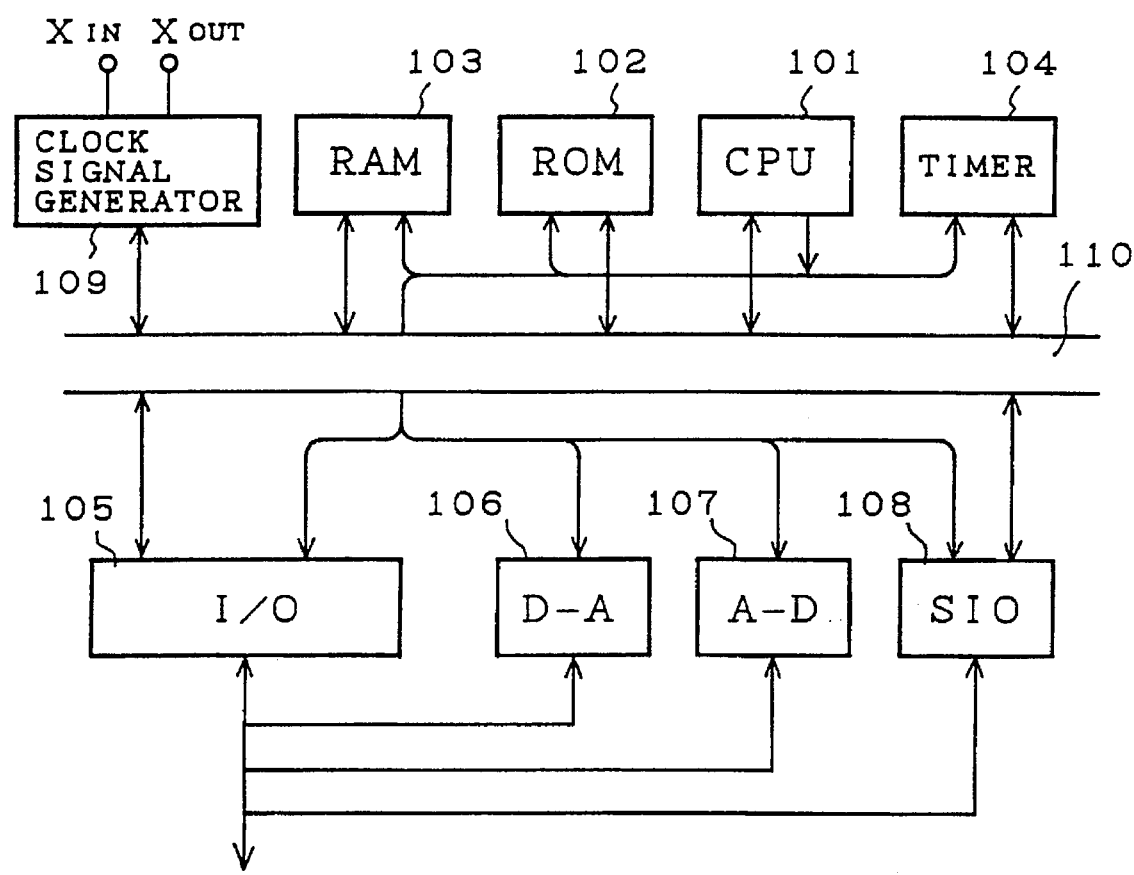
FIG. 6 is a block diagram showing an internal configuration of a one-chip microcomputer.

A receiving shift register 52 and a transmitting shift register 55 realize a serial input-output means, a clock signal control portion 51 realizes a clock signal supply means, and the exclusive-OR circuit 1 and the D flip-flop circuit 2 realize a collision detecting means. The configuration of the whole of a microcomputer is as shown in FIG. 6, for example. However, the configuration shown in FIG. 6 has a different SIO configuration. In the present embodiment, it is supposed that a microcomputer is of a type in which an input-output line for an SIO and an input-output line for an IO port 105 are used in common. Therefore, the SIOE flag which is to set the input-output line for the SIO exists in a SIO control register. The TE flag which shows the permission to output the data in the transmitting shift register 55 also exists in the SIO control register. A signal which shows the setting state of these flags in the SIO control register is input to the AND circuit 3.

Next, the operation will be explained in the following. The basic operation of input-output of data is the same as the operation of SIO shown in FIG. 5. In the case where the SIO is to be operated, the CPU 101 makes the SIOE flag in the SIO control register ON. In a transmitting period, the CPU 101 makes the TE flag in the SIO control register ON. Therefore, the reset state of the D flip-flop circuit 2 is released and it is made to be ready for operation.

In a transmitting period, when discordance occurs between a signal at the R×D terminal and a signal at the T×D terminal, the output of the exclusive-OR circuit 1 is raised to a high level. Then the output of the D flip-flop circuit 2 is made high, and an interrupt signal is given to the CPU 101. As mentioned in the above, the discordance between the signal at the R×D terminal and the signal at the T×D terminal can be detected without comparing these signals by software. In the result, the load on the software is lightened. In other words, the time to be shared for other processes, a protocol control process for example, can be increased, so that even if a data transfer speed is made high, the transmitting-receiving process can be executed.

Figure 2:
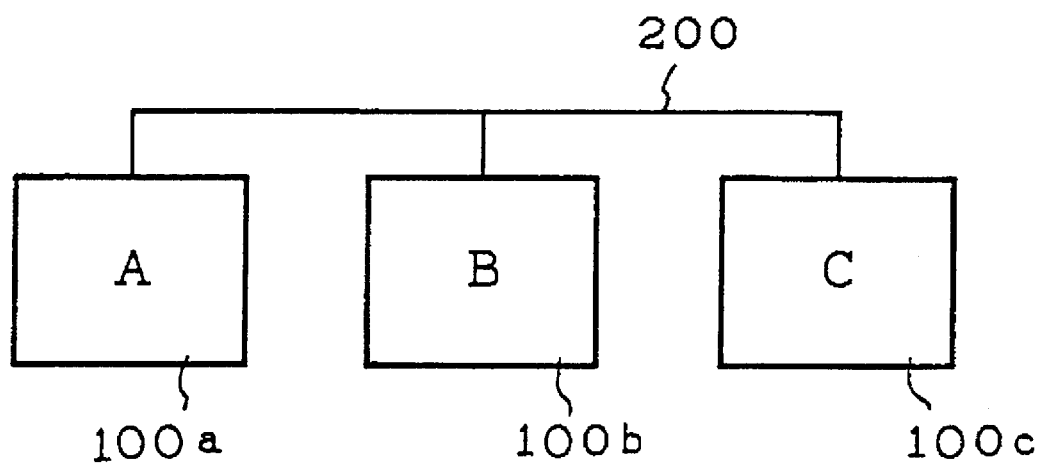
FIG. 2 is a system configuration diagram showing a connection mode of a microcomputer in a J1850 LAN.
Figure 8:
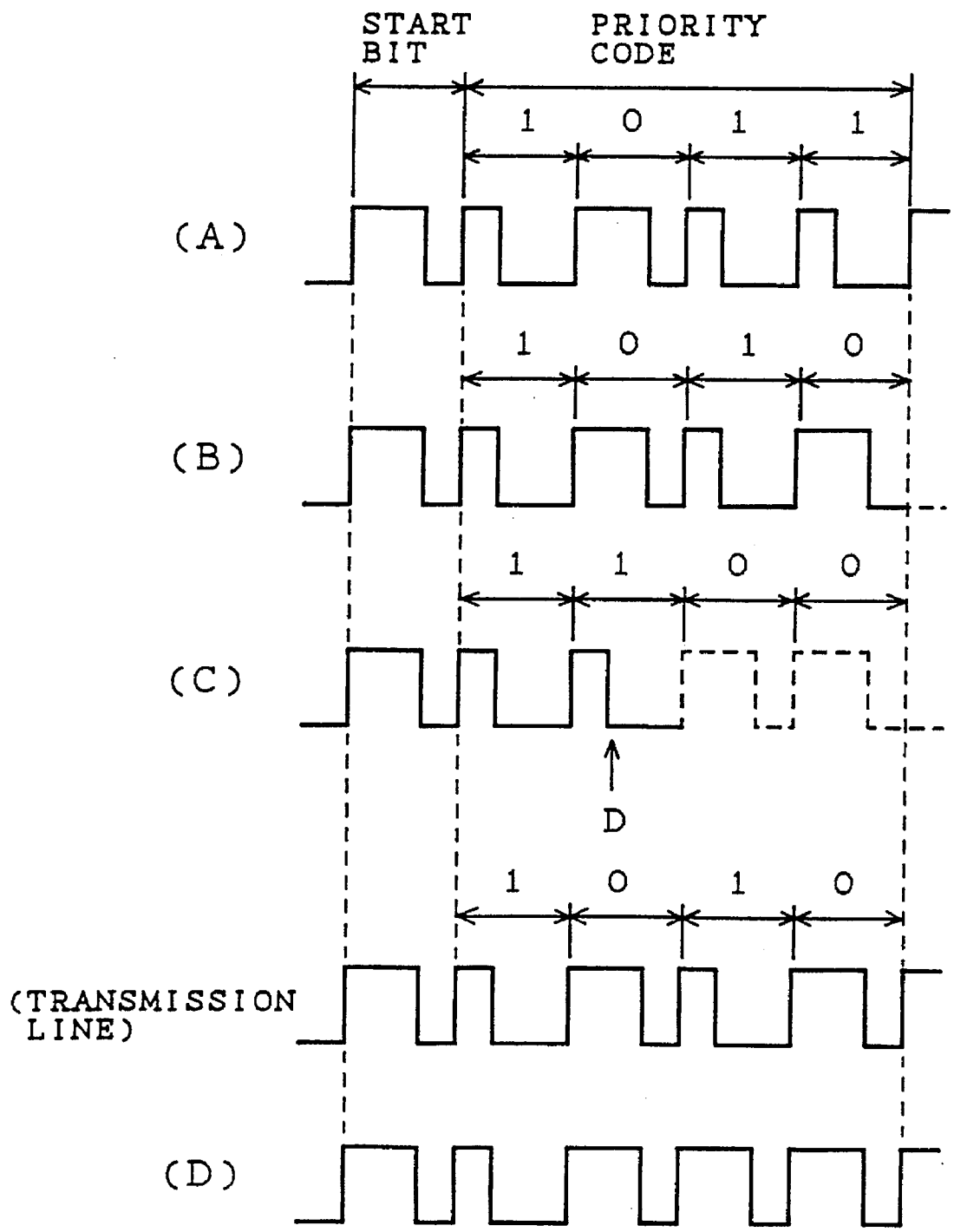
FIG. 8 is a timing chart for explaining an arbitration judgment in the J1850 standard.
Figure 9:
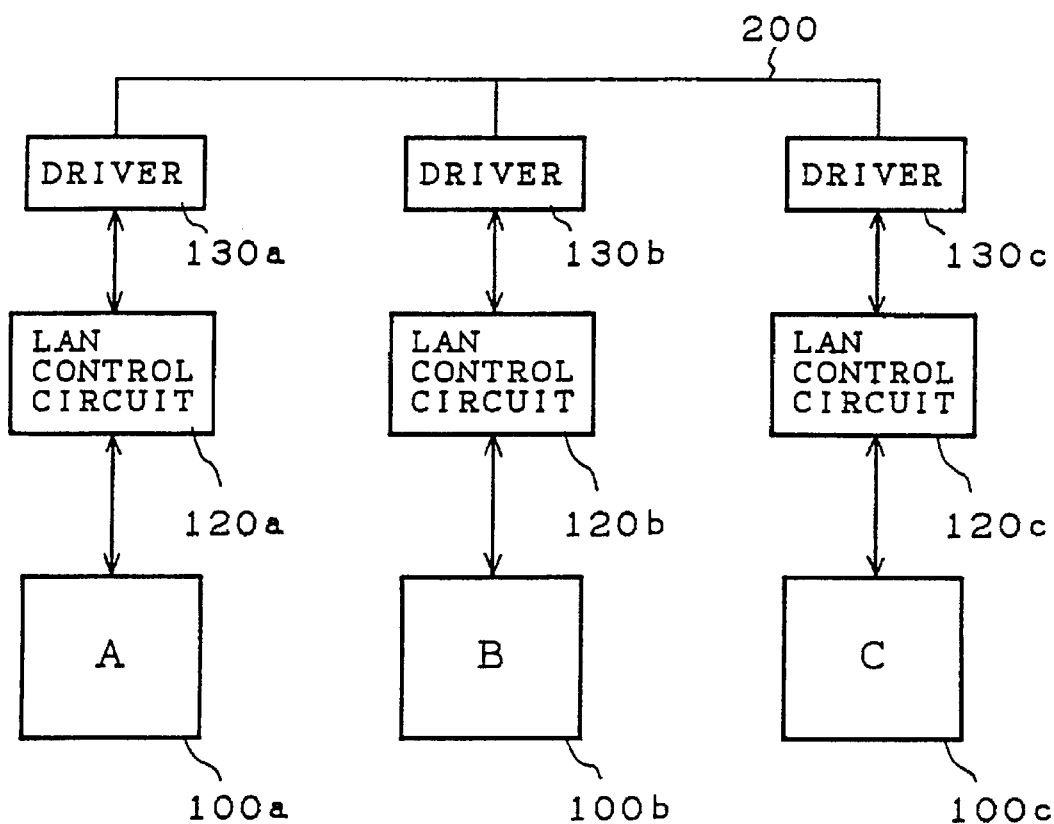
FIG. 9 is a system configuration chart showing a configuration of a LAN using conventional microcomputers.
Figure 10:
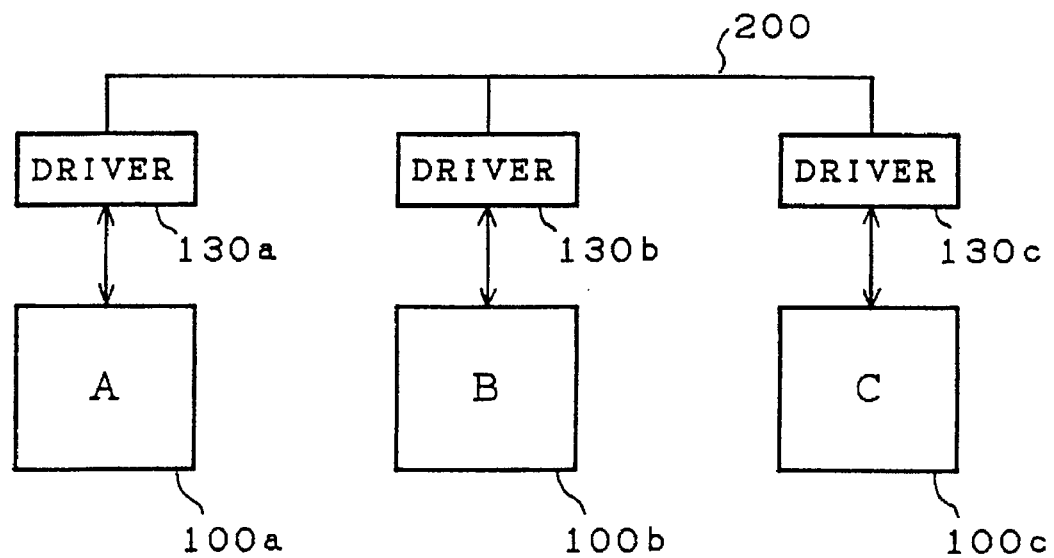
FIG. 10 is a system configuration chart showing another configuration of a LAN using conventional microcomputers.

The J1850 communication shown in FIG. 8 will be taken up as an example. In this case, respective microcomputers 100a, 100b and 100c are directly connected to the transmission line 200 as shown in FIG. 2. The transmission line 200 is connected to the R×D terminal and the T×D terminal of each of the microcomputers 100a, 100b and 100c. It is assumed that one bit in the data such as the priority code, etc. is expressed by several bits in a microcomputer. For example, it is assumed that one bit in the priority code is expressed by 3 bits inside a microcomputer (Since one bit in the priority code is expressed by 3 symbols, one symbol is expressed by one bit.).

Then on the C side, the exclusive-OR circuit 1 detects the discordance at a second bit of a second priority code (at a starting time of a second symbol of the second priority code: at a point of time D in FIG. 8). In the result, an interrupt signal is given to the CPU 101 in the microcomputer 100c. In other words, at a starting point of time of a second symbol of the second priority code, the CPU 101 in the microcomputer 100c is able to recognize immediately the discordance between the priority code and the data on the transmission line 200. If the software is incorporated in the CPU 101 which makes the transmitting operation be suspended and the receiving operation be performed solely when an interrupt signal is generated, the transmitting operation is immediately suspended at the starting point of time of the second symbol of the second priority code.

When no interrupt signal is generated, it is not necessary to suspend transmitting operation, because it means that the priority code and the data on the transmission line coincide with each other. For example, an interrupt signal does not occur on the B side shown in FIG. 8. In other words, if an interruption signal does not occur, it means that the transmitting right is obtained.

In a period while collision detection is not needed, the CPU 101 prevents unnecessary interruption by masking the interruption of collision detection. The unnecessary interruption can be also prevented by an arrangement in which 3 inputs are prepared for the AND circuit 3 and only in a period when collision detection is needed the level of the third input is made high.

As described in the above, microcomputers can be easily connected to a LAN in which collision detection is needed by incorporating a collision detection function in microcomputers. Owing to such an arrangement, microcomputers can be applied to a LAN of a higher transmission speed.

Figure 3:
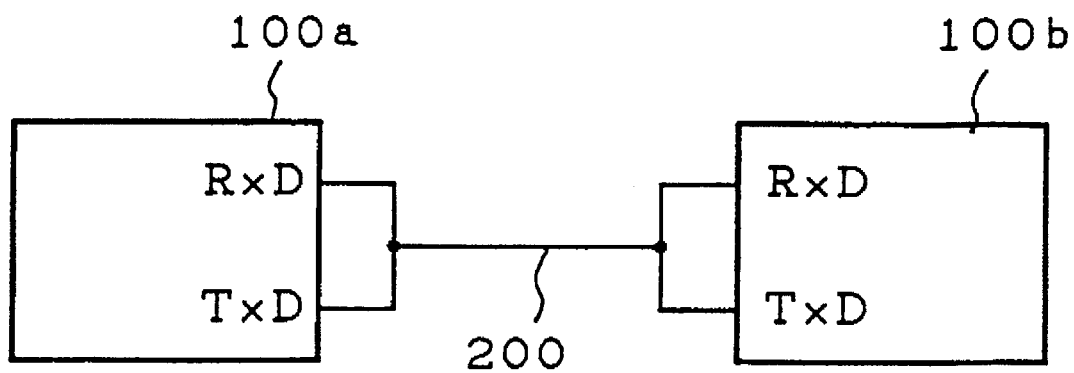
FIG. 3 is a system configuration diagram showing a connection mode of a microcomputer to an I²C bus.

There is the $I^2C$ bus system as another LAN standard. The data format in the $I^2C$ bus system is configured with 8 bit data and 1 bit acknowledgement bit (ACK/NACK bit). A bus has a wired AND connection and when any microcomputer outputs a low level signal, the level of the bus is made low. As shown in FIG. 3, the transmission line 200 which connect respective microcomputers 100a and 100b is connected to the R×D and T×D terminals in the microcomputers 100a and 100b.

When data are to be output from the microcomputer 100a, the data corresponding to the 8 bit data and one bit of a high level signal are set in the transmitting shift register 55 in the SIO of the microcomputer 100a. The data of 9 bits are output to a bus in order according to a clock signal from the transmitting shift register 55. In the transmitting period of data of 8 bits in the heading part, the receiving side does not send out data, so that the signal at the R×D terminal and the signal at the T×D terminal are the same. Therefore, the output of the exclusive-OR circuit 1 of the microcomputer 100a on the transmitting side is kept in the low level. In the case of the microcomputer 100b on the receiving side, after the reception of 8 bit data, when a positive acknowledge is to be performed, it outputs a low level signal to the transmission line 200. When a negative acknowledge is to be performed, it outputs a high level signal to the transmission line 200.

Therefore, in the microcomputer 100a on the transmitting side, when ninth bit data are to be sent out, if the microcomputer 100b on the receiving side gives a positive acknowledge, the level of the output of the exclusive-OR circuit 1 is made high. It means that an interrupt signal is given to the CPU 101. The software for controlling bus is so arranged that when an interrupt signal is given, transmitting operation is continued and when no interrupt signal is given, transmitting operation is stopped. Therefore, it is judged whether transmitting operation is to be continued or not by the existence of an interrupt signal at a point of time when the ninth bit data are to be sent out.

As described in the above, a microcomputer can be easily connected to the $I^2C$ bus by incorporating a collision detecting function in the microcomputer. In the case where a conventional microcomputer is to be connected to the $I^2C$ bus, it is necessary to judge the polarity of the ninth bit by means of software or to connect $I^2C$ bus controller, etc. When the polarity is to be judged by the software, the process needed for judgment is added as a load on the software. It means that the time which can be shared for protocol control process, etc. is shortened. Thereby, when a data transmission speed is raised, the time for processing becomes insufficient. When a microcomputer according to the present embodiment is used, since the load on the software is lightened, it is made possible to raise the transfer speed. Further, there is no need to connect $I^2C$ bus controller, etc., so that the cost of a system can be controlled to be low.

Embodiment 2

Figure 4:
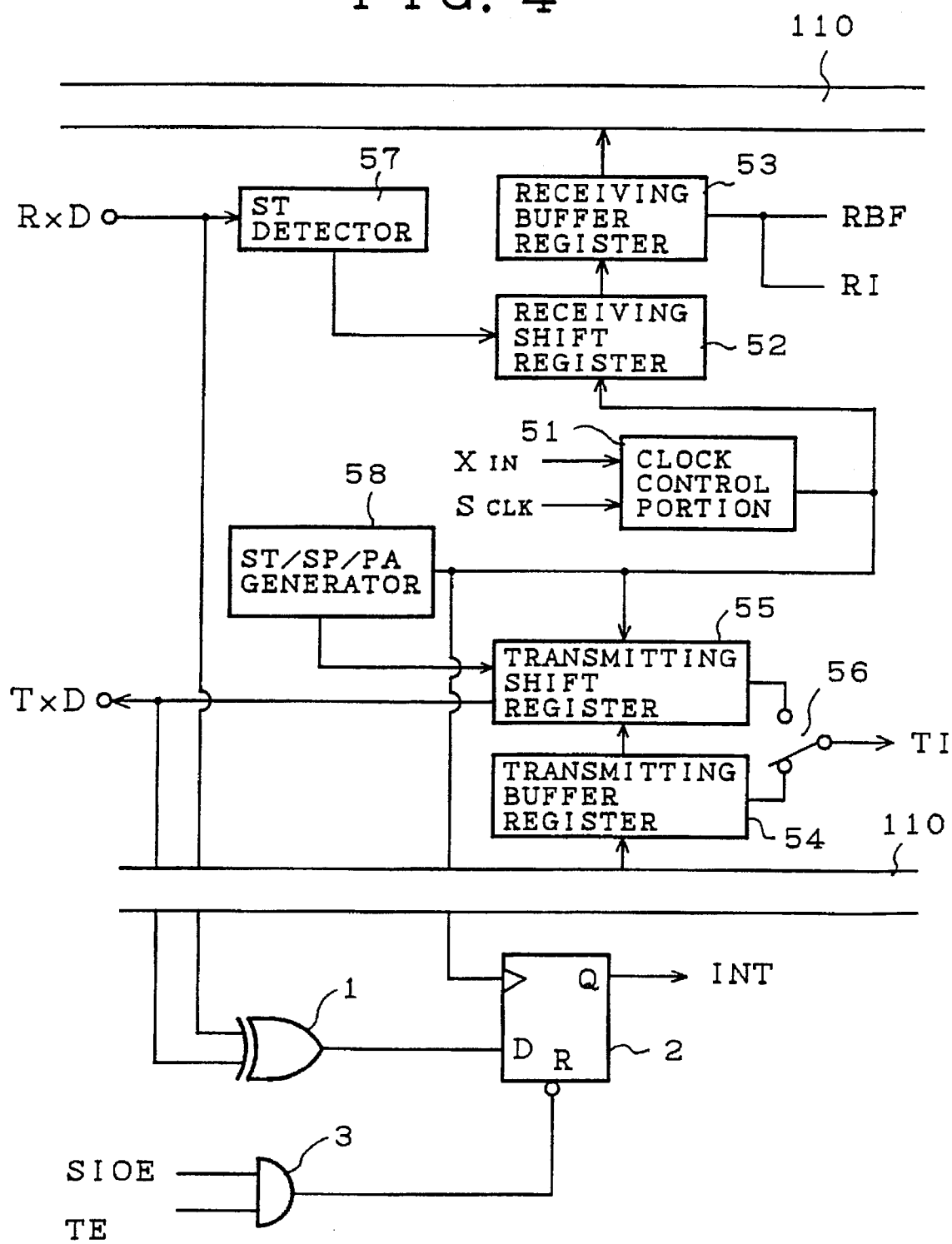
FIG. 4 is a block diagram showing a configuration of a built-in SIO in a microcomputer in a second embodiment according to the present invention.
Figure 7:
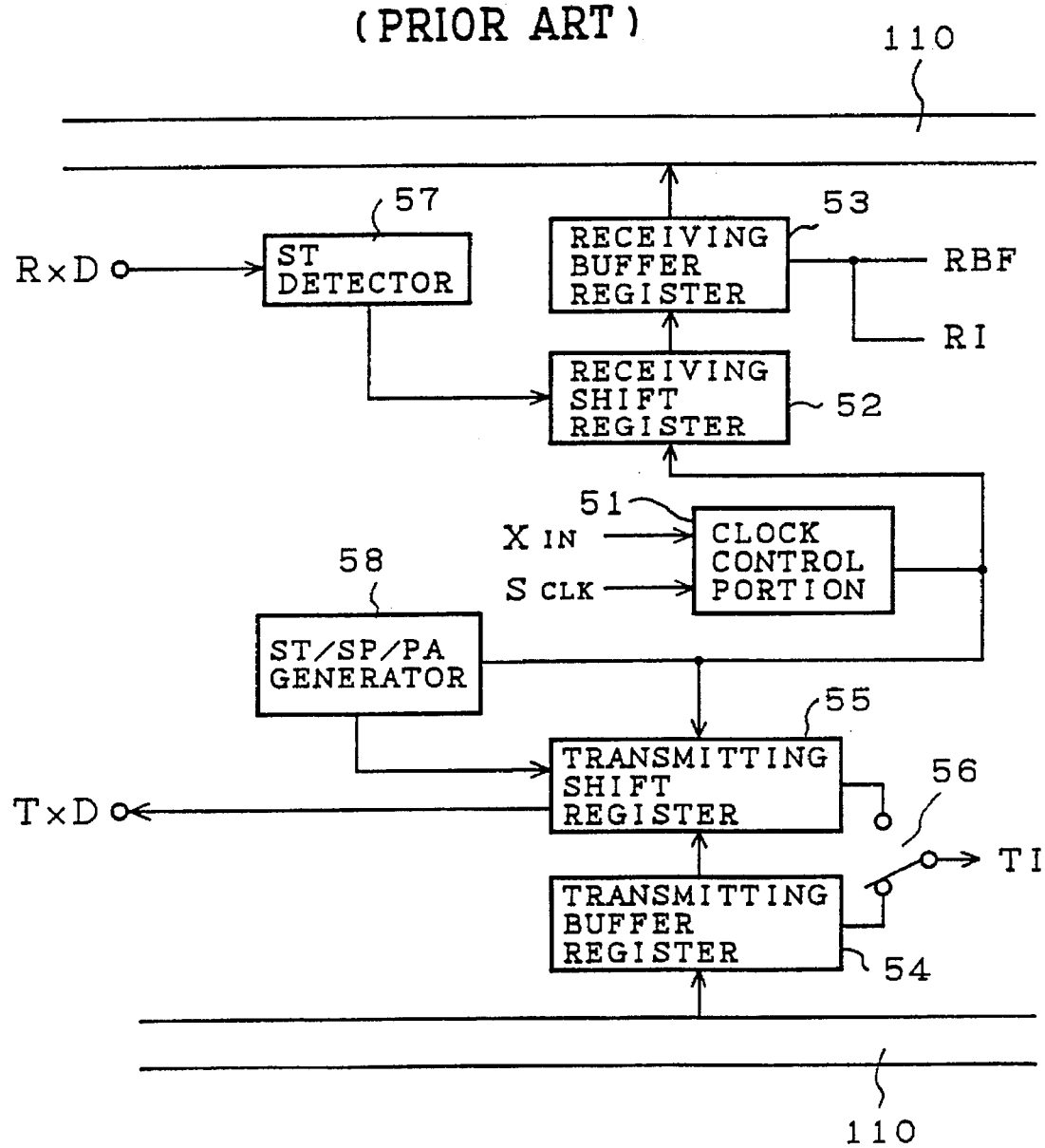
FIG. 7 is a block diagram showing another configuration of a built-in SIO in a conventional microcomputer.

FIG. 4 is a block diagram showing the configuration of an SIO in a microcomputer in a second embodiment according to the present invention. In the figure, there are shown an exclusive-OR circuit 1 for comparing a signal at a T×D terminal and a signal at an R×D terminal, a D flip-flop circuit 2 which latches the output of the exclusive-OR circuit 1 with a clock signal, an AND circuit 3 which inputs an SIOE flap and a TE flag and the output circuit is connected to a reset terminal of the D flip-flop circuit 2. Others are the same as those shown in FIG. 7.

Next, the operation will be explained. The basic operation of input-output of data is the same as that of the SIO shown in FIG. 7. When the SIO is to be operated, a reset state of the D flip-flop circuit is released and the D flip-flop circuit is in a state where it is ready to be operated.

Therefore, also in this case, in a transmitting period of data when discordance occurs between a signal at the R×D terminal and a signal at the T×D terminal, the output of the exclusive-OR circuit 1 is raised to a high level. Then a Q output of the D flip-flop circuit 2 is made to a high level, and an interrupt signal is given to the CPU 101. In such a way as described in the above, the discordance between a signal at the R×D terminal and a signal at the T×D terminal can be detected without performing a comparison process. Since there is no need to detect the discordance by the software, the load on the software is lightened. In other words, the time to be shared for other processes, for example, a protocol control process, is increased, so that the transmission-reception process can be executed even when a data transfer speed is made high.

As described in the above, the data transfer speed can be upgraded in an asynchronous data transfer system in which collision detection is needed by the incorporation of a collision detecting function in the SIO to realize the asynchronous data transfer system.

As described in the above, according to the present invention, a microcomputer has a configuration in which a collision detecting means for comparing a signal supplied to an output terminal and a signal from an input terminal is provided in an input-output circuit, so that there is an effect that a load on the software in a LAN communication is decreased, and the data transfer speed in a LAN can be made high even when the microcomputer is connected directly to a transmission line without adding the LAN control circuit, etc. to the microcomputer.

What is claimed is:

1. A microcomputer having a built-in serial input-output circuit, an IO port and a CPU, said built-in serial input-output circuit and said IO port sharing a common input-output line for inputting and outputting data, said built-in serial input-output circuit comprising:

a serial input-output means for converting parallel data into serial data and outputting said serial data to an output terminal and for converting serial data input from an input terminal into parallel data;

a clock signal supply means for supplying a data transfer clock signal to said serial input-output means; and a collision detection circuit, activated in response to a control signal indicating that the common input-output line is occupied by said built-in serial input-output circuit, for comparing a first signal supplied to said output terminal with a second signal supplied to said input terminal and supplying an interrupt signal to said CPU when said first and second signals are in discordance.

2. The microcomputer as defined in claim 1, wherein said collision detecting circuit comprises:

an exclusive-OR circuit for detecting the discordance between said first signal at a serial input terminal and said second signal at a serial output terminal and for outputting a discordance signal upon a discordance;

a D flip-flop circuit for latching said discordance signal and for outputting said interrupt signal to said CPU; and a logic circuit for resetting said D flip-flop circuit in response to said control signal.

3. The microcomputer as defined in claim 2, wherein said CPU is responsive to the output of said D flip-flop circuit to interrupt transmission of data from said built-in serial input-output circuit.

4. The microcomputer as defined in claim 3, wherein said CPU suspends the serial output from said built-in serial input-output circuit upon receiving said interrupt signal from the D flip-flop circuit.

5. The microcomputer as defined in claim 2, including a control means for generating input and output data start and stop bits for operating said built-in serial input-output means and for supplying said start and stop bits to said built-in serial input-output means.

6. The microcomputer as defined in claim 2, further comprising:

a SIO control register for storing a SIO enable (SIOE) flag and a transmit enable (TE) flag; and wherein said logic circuit comprises a logic gate having inputs thereof coupled to said SIO control register.

* * * * *